(12) United States Patent
Solomon

(10) Patent No.: US 9,925,651 B1
(45) Date of Patent: Mar. 27, 2018

(54) VALVE REPAIR TOOL AND METHOD

(71) Applicant: Robert A. Solomon, Brunswick, GA (US)

(72) Inventor: Robert A. Solomon, Brunswick, GA (US)

(\*) Notice: Subject to any disclaimer, the term of this patent is extended or adjusted under 35 U.S.C. 154(b) by 0 days.

(21) Appl. No.: 15/344,719

(22) Filed: Nov. 7, 2016

Related U.S. Application Data

(60) Provisional application No. 62/263,004, filed on Dec. 4, 2015.

(51) Int. Cl.
| | |
|---|---|
| *B25B 27/14* | (2006.01) |
| *B23P 19/04* | (2006.01) |
| *B25B 27/24* | (2006.01) |
| *B60C 25/18* | (2006.01) |
| *F16K 15/06* | (2006.01) |
| *B25B 13/54* | (2006.01) |

(52) U.S. Cl.
CPC .............. *B25B 27/24* (2013.01); *B25B 13/54* (2013.01); *F16K 15/06* (2013.01); *Y10T 137/6109* (2015.04)

(58) Field of Classification Search
CPC ......... B25B 27/24; B25B 13/54; F16K 15/06; Y10T 137/6109
See application file for complete search history.

(56) References Cited

U.S. PATENT DOCUMENTS

| | | | | |
|---|---|---|---|---|
| 1,354,201 | A * | 9/1920 | Kraft | B60C 29/06 138/89.3 |
| 1,390,707 | A * | 9/1921 | Henemier | B60C 29/06 138/89.2 |
| 1,489,364 | A * | 4/1924 | Schweienert | B60C 29/06 138/89.3 |
| 1,672,082 | A * | 6/1928 | Oakley | B21K 21/00 29/890.132 |
| 1,756,273 | A * | 4/1930 | Wynkoop | B60C 23/0403 116/34 R |
| 1,767,884 | A * | 6/1930 | Heinrich | B60C 29/06 138/89.3 |
| 1,769,663 | A * | 7/1930 | David | F16K 15/20 137/233 |
| 1,803,373 | A * | 5/1931 | Wahl | B60C 29/06 138/89.3 |
| 6,862,787 | B2 * | 3/2005 | Groves | B25B 13/48 29/221.5 |
| 6,944,924 | B2 * | 9/2005 | Hayes | B25B 27/24 29/221.5 |
| 2004/0060157 | A1 * | 4/2004 | Benefield | B25B 27/0035 29/240 |
| 2008/0127472 | A1 * | 6/2008 | Whitehead | B25B 13/48 29/221.5 |

\* cited by examiner

*Primary Examiner* — Craig Schneider
*Assistant Examiner* — Kevin Barss
(74) *Attorney, Agent, or Firm* — Jonathan R. Smith; Jonathan Rigdon Smith, J.D., PC

(57) ABSTRACT

A valve repair tool is a rod having a forked valve stem extractor on one end and a cap at the other end with a flare fitting rounding part built into it.

15 Claims, 3 Drawing Sheets

VALVE REPAIR TOOL AND METHOD

CROSS-REFERENCES TO RELATED APPLICATIONS

This nonprovisional patent application claims priority of U.S. provisional application No. 62/263,004, filed Dec. 1, 2015.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

REFERENCE TO A BIOLOGICAL SEQUENCE LISTING

Not applicable.

BACKGROUND OF INVENTION

Field of the Invention

This invention is in the field of valve repair, more specifically in the field of repair of leaks in gas valves, and still more specifically in the field of repair of gas and liquid fill check valves.

Description of the Related Art

Gas valves require perfect gas-tight seal, usually accomplished by very tight compression of polished round metal surfaces together (a "compression fitting" or "flare fitting") or compression of resilient, gas-compatible polymeric material such as a washer or gasket against a polished metal surface, as in the case of a gas valve stem. The gas valve stem widely used for inflating a vehicle tire, recharging an air conditioner or refrigeration system, and other systems to which compressed gas may need to be added, comprises a hollow body through which gas pushes in one direction. In the remainder of this description, the invention will be described in terms of use in servicing refrigeration service ports such as the hot gas ports, cold gas ports, and liquid ports in refrigeration/air conditioning service, but the parts and their interaction will work in principle with modifications in part shapes that are used in many other compressed gas and liquid charging and discharging applications. The body is seated within a flare fitting in which a resilient portion of the exterior surface of the body is screwed tightly against the internal surface of the flare fitting. The annular bottom of the body is sealed against upward passage of gas by a small disc containing a resilient ring that is forced against the bottom of the body both by the pressure of the gas below it and a spring inside the body. The ring can be manually moved away from the bottom of the body by finger or tool pressure against a plunger connected to the disc, overcoming the gas pressure and the spring tension, allowing gas to escape. A secondary seal against gas leakage is provided by a valve cap that compression fits over the male flare fitting containing the valve stem. For this to work, both the interior of the cap and the exterior of the fitting must be perfectly round.

Compression and flare fittings are subject to damage by accidental tool blows, twisting, over-tightening, and/or cross-threading of mating parts. This damage is cumulative over years of servicing. Eventually, it may allow leakage between the male flare fitting and the cap or other mating part, which is not a problem as long as the valve stem itself seals properly. However, over time, the stem mechanism and its resilient parts may fail, allowing gas to leak continuously, requiring replacement of the stem. The stem must be unscrewed from within the male flare fitting using a special forked tool. If the male flare fitting is distorted, it may not allow the stem to be unscrewed. The interior of the flare fitting can sometimes be restored to sufficient roundness to allow the stem to be unscrewed by working it with a screwdriver, pliers and/or other tools, but such work is laborious and time-consuming, and not always successful. Even if such work allows the stem to be replaced, the cap seal may leak. Either way, in the case of air conditioning fill valves, replacing the entire flare fitting usually requires complete draining of the refrigerant, an even more laborious and time-consuming endeavor.

BRIEF DESCRIPTION OF THE INVENTION

Objects of the Invention

The principal object of this invention is to provide a simple, inexpensive, and reliable means for restoring the roundness of the flare fitting and removing the gas valve stem.

SUMMARY OF THE INVENTION

The present invention is a rod having a forked stem extractor on one end and having at the other end a cap with a flare fitting rounding tool built into it.

DETAILED DESCRIPTION OF THE INVENTION

Figure 1:
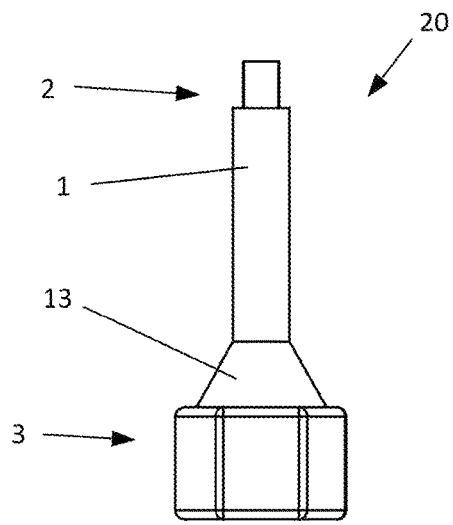
FIG. 1 is a front view of the present invention.

Referring now to the drawings, in which like reference characters refer to like elements among the drawings, FIG. 1 is a front view of the present invention 20. It comprises a rod 1, a fork tool 2 at the upper end, and a rounding tool 3 at the lower end. An optional circular fillet or, as shown here, a chamfer 13 strengthens the joint between the rod 1 and the rounding tool 3.

Figure 2:
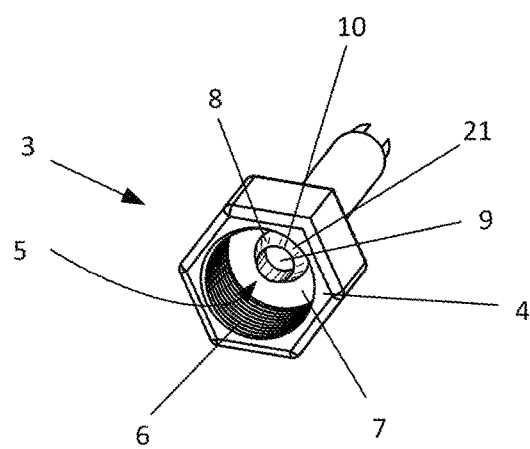
FIG. 2 is an oblique view of the invention as seen from below.

FIG. 2 is an oblique view of the invention as seen from below. The rounding tool 3 comprises a cap 4 having an interior 5 with threaded walls 6 and an upper face 7. The upper face 7 has a conical central downward projection 8, the projection having a central bore 9 in it, which together produce a rounding edge 10 surrounded by a beveled rounding surface 21. The cap 4 has hexagonal faces 11 to enable turning the entire invention 20 with a wrench (not shown). Optionally, the conical downward projection may be substituted by a shape other than a cone such as a hemisphere or other curve of rotation producing a rounding surface.

Figure 3:
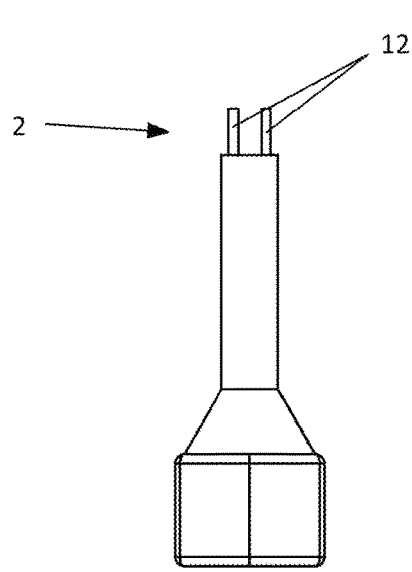
FIG. 3 is a left side view of the invention.

FIG. 3 is a left side view of the invention, showing the separation of the fork 12 on the fork tool 2.

Figure 4:
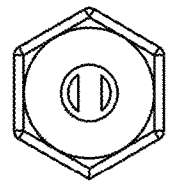
FIG. 4 is a top view of the invention.

FIG. 4 is a top view of the invention.

Figure 5:
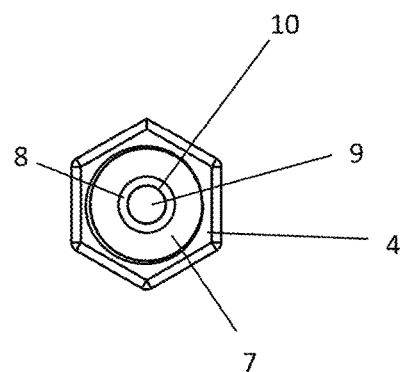
FIG. 5 is a bottom view of the invention.

FIG. 5 is a bottom view of the invention showing the upper face 7, the downward projection 8, the central bore 9, and the rounding edge 10, all inside the cap 4.

Figure 6:
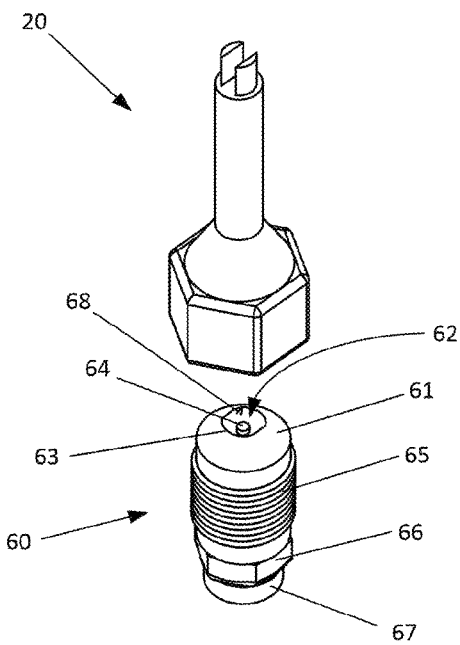
FIG. 6 is an oblique view of the invention with a valve needing repair.

FIG. 6 is an oblique view of the invention 20 lined up with a valve 60 needing repair. The valve 60 typically comprises a male flare fitting 61, a valve bore 62, a valve bore edge 63, a valve stem plunger 64, external threads 65, gripping faces 66, and a female tubing connector sleeve 67. The valve bore edge 63 shows damage, namely not being round (elliptical in this view) and showing crimping marks 68 inside.

Figure 7:
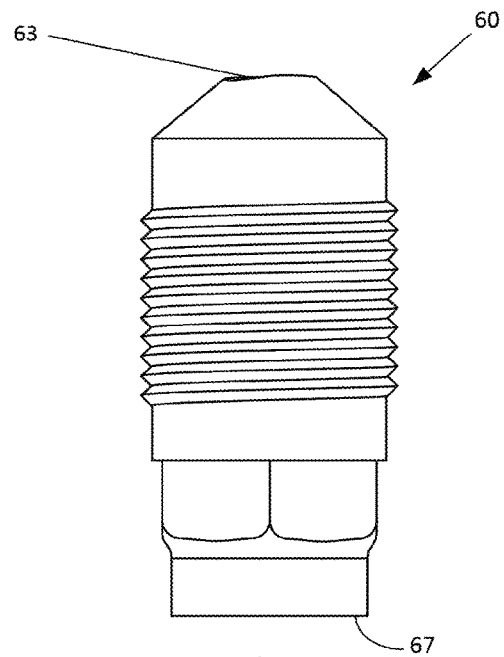
FIG. 7 is a front view of a valve needing repair.

FIG. 7 is a front view of the valve 60 needing repair. The valve bore edge 63, if undamaged, would appear as a straight horizontal line in this view. At the bottom of the valve is the female connector sleeve 67.

Figure 8:
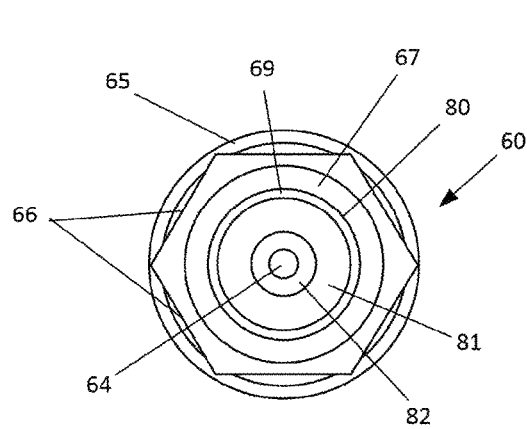
FIG. 8 is a bottom view of the valve needing repair.

FIG. 8 is a bottom view of the valve 60 needing repair. The external threads 65 and gripping faces 66 are outermost in this view. The element of the valve 60 closest to the viewer here is the female tubing connector sleeve 67. Inside the sleeve 67 is the valve bore wall 80 extending away from the viewer. Visible immediately inside the valve bore wall 80 is a resilient ring 69 compressed between the the valve bore wall 80 and the valve stem 81. The bottom side of the valve stem disc 82 is also visible; it is movable toward and away from the viewer because it is attached to the bottom end of the valve stem plunger 64.

Figure 9:
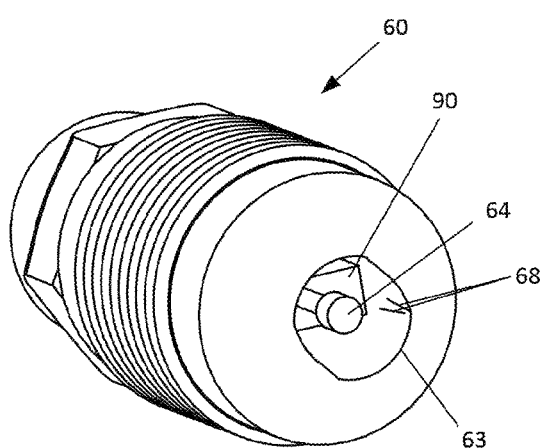
FIG. 9 is a close-up oblique view of the valve needing repair.

FIG. 9 is a close-up oblique view of the valve 60 needing repair. The valve bore edge 63 shows damage, namely not being round (or elliptical in this view) and showing crimping marks 68 inside. The upper end of the valve stem plunger 64 can clearly be seen here. To remove the entire valve stem from the valve bore 62, the rectangular valve stem head 90 must be rotated counterclockwise in this view (threads not visible). Because the valve bore edge 63 is not round, the valve stem head 90 cannot be rotated completely free of the valve 60.

Figure 10:
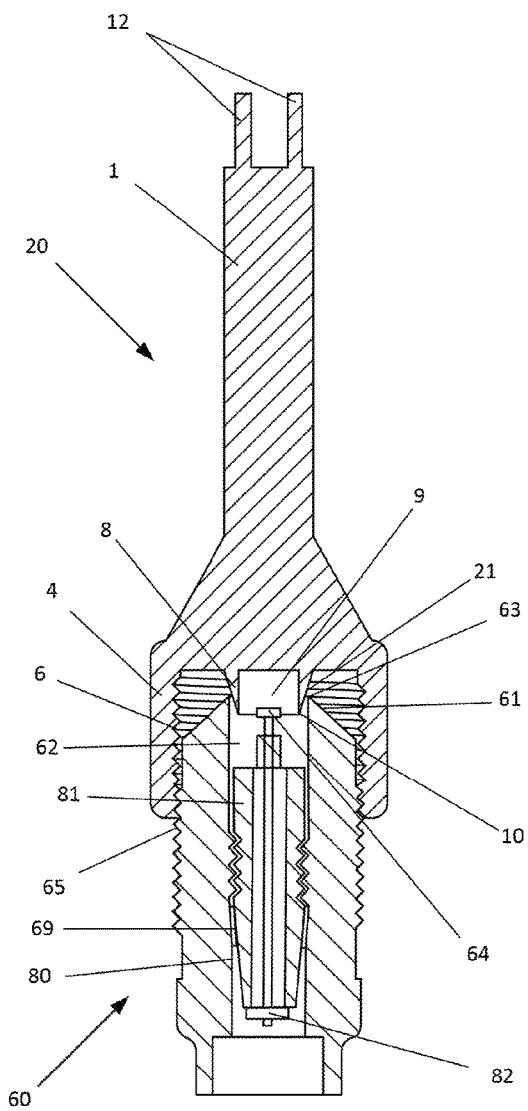
FIG. 10 is a cross-sectional view of the present invention repairing a valve.

FIG. 10 is a cross-sectional view of the present invention 20 being used to repair the valve 60. Cap 4 has been screwed down onto valve 60 by engaging its external threads 65 with threaded walls 6 inside cap 4. This advances the downward projection 8 towards the valve bore edge 63. At a certain point, the beveled rounding surface 21 comes into contact with the bore edge 63. The cap 4 and the downward projection 8 are made of metal having a higher yield strength than that of the flare fitting 61, so that with further tightening of the cap 4, the bore edge 63 will round out to match the horizontal contour of the rounding surface 21. The valve stem 81 is also shown here within the valve bore 62. Note that the valve stem 81 is screwed down into the valve bore 62, forming a gas tight seal by compressing a resilient ring 69 between the valve stem 81 and the valve bore wall 80. Note that the central bore 9 in the downward projection 8 allows space for the valve stem plunger 64.

The invention 20 is depicted here as fork 12 connected to a cap 4 by a rod 1. It is within the scope of this invention to connect the fork 12 to the cap 4 directly or by intervening material of any shape such as, but not limited to, a crosspiece attached to the rod 1 to enable hand tightening of the cap 4 against the valve 60. The scope of this invention also includes the cap 4 by itself or in combination with hand-tightening means, without limitation. The scope of this invention further includes a cap 4 equipped with a downward projection 8 of a shape other than conical that performs in an equivalent manner, such as, by examples and not limitation, one formed by rotation of a plane geometric figure about the axis of the cap 4 such as would be produced by rotating a quadrant of a circle about the axis to produce a hemisphere.

Figure 11:
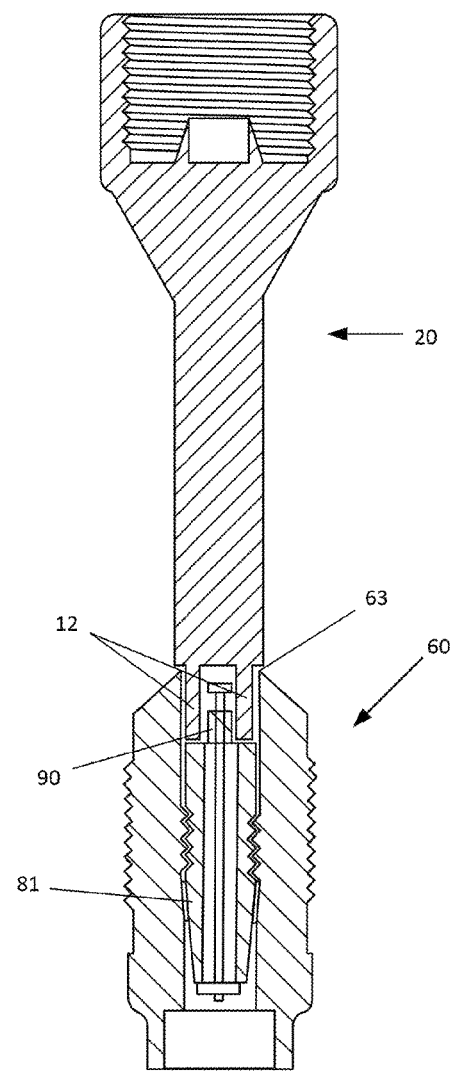
FIG. 11 is a cross-sectional view of the present invention removing a valve stem from a repaired valve.

FIG. 11 is a cross-sectional view of the present invention 20 removing a valve stem 81 (presumably damaged) from a repaired valve 60. With the bore edge 63 rounded out to its proper shape in accordance with the instruction of FIG. 10, the valve stem 81 can be removed from the valve 60 by inverting the invention 20, applying the fork 12 to the sides of the valve stem head 90, and turning the invention 20 in the proper direction to unscrew the valve stem 81.

Modifications and alterations to this invention will occur to others upon reading and understanding the above detailed description. The invention should be construed to include all such modifications and alterations as they may come within the scope of the appended claims or the equivalents thereof.

The invention claimed is:

1. A tool, comprising:
 a cap having an open bottom and a top, comprising:
  an open cylindrical interior beginning at the open bottom and extending part way upward into the cap;
   the open cylindrical interior having a vertical axis, a threaded wall, and an upper face;
    the upper face comprising a projection extending downwardly from the upper face;
 a rod extending upwardly from the top, having an upper end; and
 a fork shaped to grip a valve stem head extending upwardly from the upper end.

2. The tool of claim 1, wherein:
 said projection comprises a sloped wall coaxial with said vertical axis.

3. A method for using the tool of claim 2, comprising the step of:
 (a) screwing said threaded wall of said cap downward over the external threads of a valve until the sloped wall enters the valve bore and presses the bore edge outwardly.

4. The method of claim 3, comprising the additional steps of:
 (b) unscrewing said cap;
 (c) inverting said tool;
 (d) gripping the stem head of said valve with said fork; and
 (e) unscrewing the stem head.

5. A tool, comprising:
 a cap having an open bottom and a top, comprising:
  an open cylindrical interior beginning at the open bottom and extending part way upward into the cap;
   the open cylindrical interior having a vertical axis and terminating at an upper face, and comprising:
    a threaded wall; and
    a cone having its base fixed to the upper face and extending downwardly from the upper face;

the cone having a central bore along the vertical axis
a rod extending upwardly from the top;
the rod being coaxial with the vertical axis and having an upper end; and
a fork shaped to grip a valve stem head extending upwardly from the upper end.

6. The tool of claim 2, wherein:
the base of said sloped wall is larger than the bore of a valve;
said central bore is smaller than the bore of the same valve; and
said central bore is larger than the stem head of the same valve.

7. The tool of claim 2, comprising:
means for applying torque to the tool, selected from the list consisting of:
(a) faces on said cap for gripping with a wrench;
(b) a crosspiece fixed to the tool; and
(c) both (a) and (b).

8. The tool of claim 5, wherein:
the base of said cone is larger than the bore of a valve;
said central bore is smaller than the bore of the same valve; and
said central bore is larger than the stem head of the same valve.

9. The tool of claim 5, comprising:
means for applying torque to the tool, selected from the list consisting of:
(a) faces on said cap for gripping with a wrench;
(b) a crosspiece fixed to the tool; and
(c) both (a) and (b).

10. A tool, comprising:
a cap having an open bottom and a top, comprising:
an open cylindrical interior beginning at the open bottom and extending part way upward into the cap;
the open cylindrical interior having a vertical axis, a threaded wall, and an upper face;
the upper face comprising a downward projection;
the downward projection having a base at the upper face, a sloped wall, and a central bore along the vertical axis.

11. The tool of claim 10, wherein:
the base of said sloped wall is larger than the bore of a valve;
said central bore is smaller than the bore of the same valve; and
said central bore is larger than the stem head of the same valve.

12. The tool of claim 10, comprising:
means for applying torque to the tool, selected from the list consisting of:
(a) faces on said cap for gripping with a wrench;
(b) a crosspiece fixed to the tool; and
(c) both (a) and (b).

13. The tool of claim 10, wherein:
said downward projection is a cone.

14. The tool of claim 13, wherein:
the base of said cone is larger than the bore of a valve;
said central bore is smaller than the bore of the same valve; and
said central bore is larger than the stem head of the same valve.

15. The tool of claim 13, comprising:
means for applying torque to the tool, selected from the list consisting of:
(a) faces on said cap for gripping with a wrench;
(b) a crosspiece fixed to the tool; and
(c) both (a) and (b).

* * * * *